US007586903B2

(12) United States Patent
Song et al.

(10) Patent No.: US 7,586,903 B2
(45) Date of Patent: Sep. 8, 2009

(54) SYSTEM AND METHOD FOR VOIP CALL TRANSFER USING INSTANT MESSAGE SERVICE IN AN IP MULTIMEDIA SUBSYSTEM

(75) Inventors: Kevin Song, Carrollton, TX (US); Chou-Ling Ting, Plano, TX (US); Chifu Lin, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 687 days.

(21) Appl. No.: 11/148,758

(22) Filed: Jun. 9, 2005

(65) Prior Publication Data

US 2006/0092970 A1 May 4, 2006

Related U.S. Application Data

(60) Provisional application No. 60/622,753, filed on Oct. 28, 2004.

(51) Int. Cl.
*H04L 12/66* (2006.01)
(52) U.S. Cl. .................................. 370/352; 709/246
(58) Field of Classification Search ............ 370/395.02, 370/212.01, 395.52, 352–356; 379/88.12, 379/88.17, 202.01, 207.01, 212.01; 709/246
See application file for complete search history.

(56) References Cited

U.S. PATENT DOCUMENTS

| 7,181,537 | B2 * | 2/2007 | Costa-Requena et al. ... 709/246 |
| 2004/0037406 | A1 * | 2/2004 | Gourraud ............... 379/202.01 |
| 2004/0193727 | A1 * | 9/2004 | Varga et al. ................. 709/238 |

OTHER PUBLICATIONS

Debbabi, et al, "Standard SIP-Based Instant Messaging and Presence APIs for Networked Devices" ☐☐2002 IEEE 5th International Workshop on Networked Appliances, Oct. 30-31, 2002, pp. 59-64.*

\* cited by examiner

*Primary Examiner*—Ricky Ngo
*Assistant Examiner*—Pao Sinkantarakorn

(57) ABSTRACT

The Instant Messaging capability of an IP multimedia subsystem is utilized to support call transfer service for VoIP users. A call transfer request from a first VoIP user to a second VoIP user is sent to the IP multimedia subsystem in a predetermined non-standard SIP communication. The IP multimedia subsystem invokes Instant Messaging service in response to the predetermined non-standard SIP communication, and Instant Messaging service is then utilized to support the call transfer dialogue.

20 Claims, 3 Drawing Sheets

SYSTEM AND METHOD FOR VOIP CALL TRANSFER USING INSTANT MESSAGE SERVICE IN AN IP MULTIMEDIA SUBSYSTEM

CROSS-REFERENCE TO RELATED APPLICATION AND CLAIM OF PRIORITY

The present invention is related to that disclosed in U.S. Provisional Patent No. 60/622,753, filed Oct. 28, 2004, entitled "IMS Call Transfer—Instant Message Implementation Strategy". U.S. Provisional Patent No. 60/622,753 is assigned to the assignee of the present application and is hereby incorporated by reference into the present disclosure as if fully set forth herein. The present application hereby claims priority under 35 U.S.C. §119(e) to U.S. Provisional Patent No. 60/622,753.

TECHNICAL FIELD OF THE INVENTION

The present invention generally relates to telecommunication systems and, more specifically, to providing telecommunication services with an IP multimedia subsystem.

BACKGROUND OF THE INVENTION

The following documents are incorporated herein by reference: draft-ietf-sippint-service-example-07; draft-ietf-sip-rfc2543 Session Initiation Protocol; 3GPP TS 29.228; and 3GPP TS 23.218.

The 3GPP standard describes an Internet Protocol (IP) multimedia subsystem (IMS) that comprises the core network (CN) devices that provide IP multimedia services, including audio, video, text, instant messaging, chat and the like, and combinations thereof, delivered over the Internet and/or the public switched telephone network. Voice over IP (VoIP) telephony is supported, but there is no provision for supporting call transfer functionality among VoIP users.

Therefore, there is a need in the art for an improved IP multimedia subsystem that is capable of providing call transfer service for VoIP users.

SUMMARY OF THE INVENTION

The present invention expands the capabilities of an IP multimedia subsystem by providing call transfer service for VoIP users. The call transfer service is supported by accessing Instant Messaging capability within the IP multimedia subsystem.

To address the above-discussed deficiencies of the prior art, it is a primary object of the present invention to provide an Internet Protocol (IP) multimedia subsystem for use in a telecommunication network. According to an advantageous embodiment of the present invention, the IP multimedia subsystem comprises an IP switch capable of receiving Session Initiation Protocol (SIP) communications from an external IP network, and a call application node capable of executing a plurality of service applications, including a serving call session control function (S-CSCF) application and an application server (AS) application. The S-CSCF application receives, from a first Voice over IP (VoIP) user via the external IP network and the IP switch, a communication that includes a request from the first VoIP user to transfer to a second VoIP user a VoIP call that is currently in progress between the first VoIP user and a third VoIP user. The S-CSCF application recognizes that the received communication includes a SIP communication component but fails to a constitute a communication permitted by SIP. In response to this recognition, the S-CSCF application modifies the received communication to include an Instant Messaging (IM) identifier, and forwards the modified communication to the AS application. In response to the IM identifier in the modified communication, the AS application processes the modified communication as an Instant Message.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
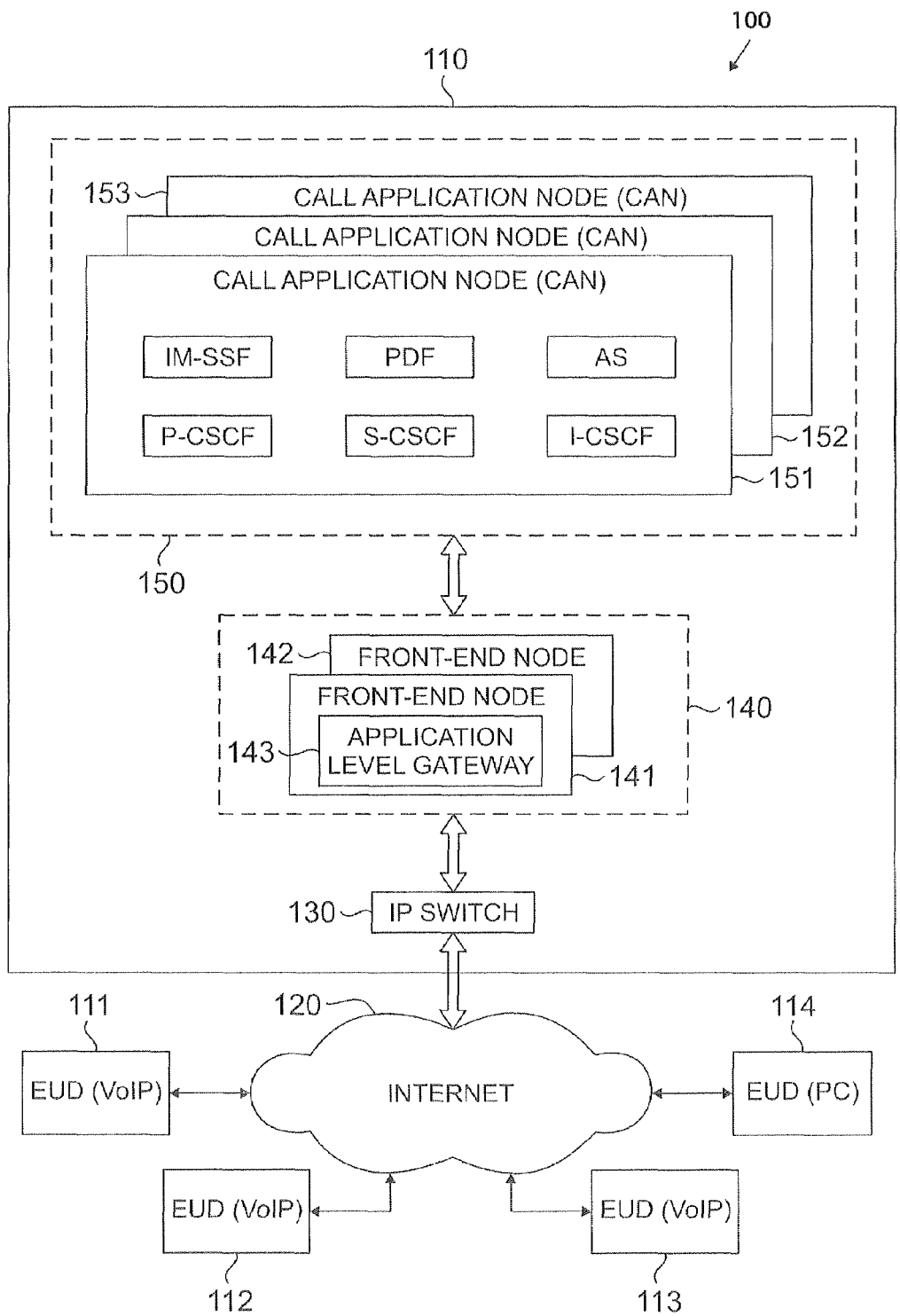
FIG. 1 illustrates a telecommunication network comprising an IP multimedia subsystem (IMS) according to the principles of the present invention.
Figure 2:
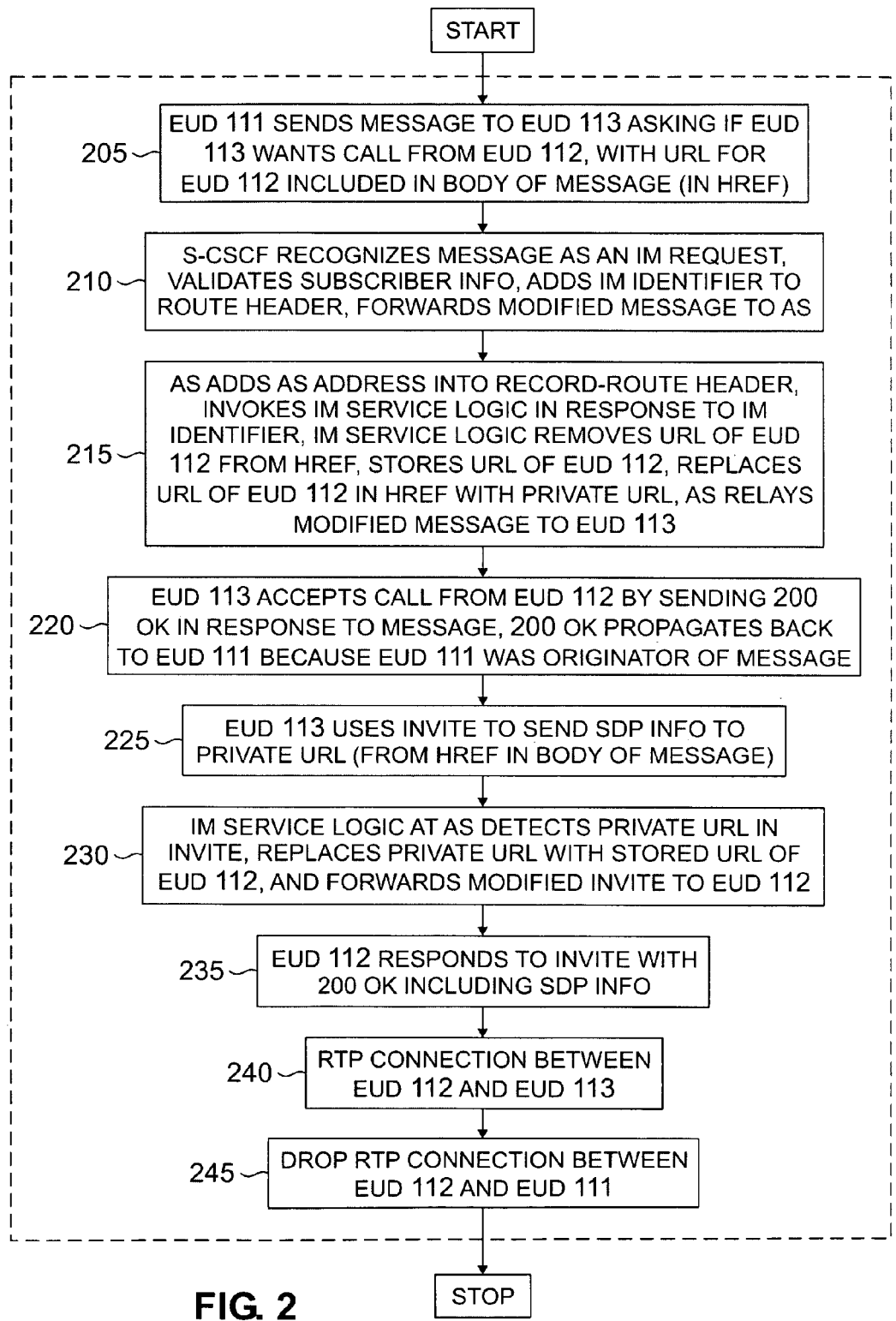
FIG. 2 is a flow diagram illustrating the operation of the IP multimedia subsystem (IMS) according to an exemplary embodiment of the present invention.
Figure 3:
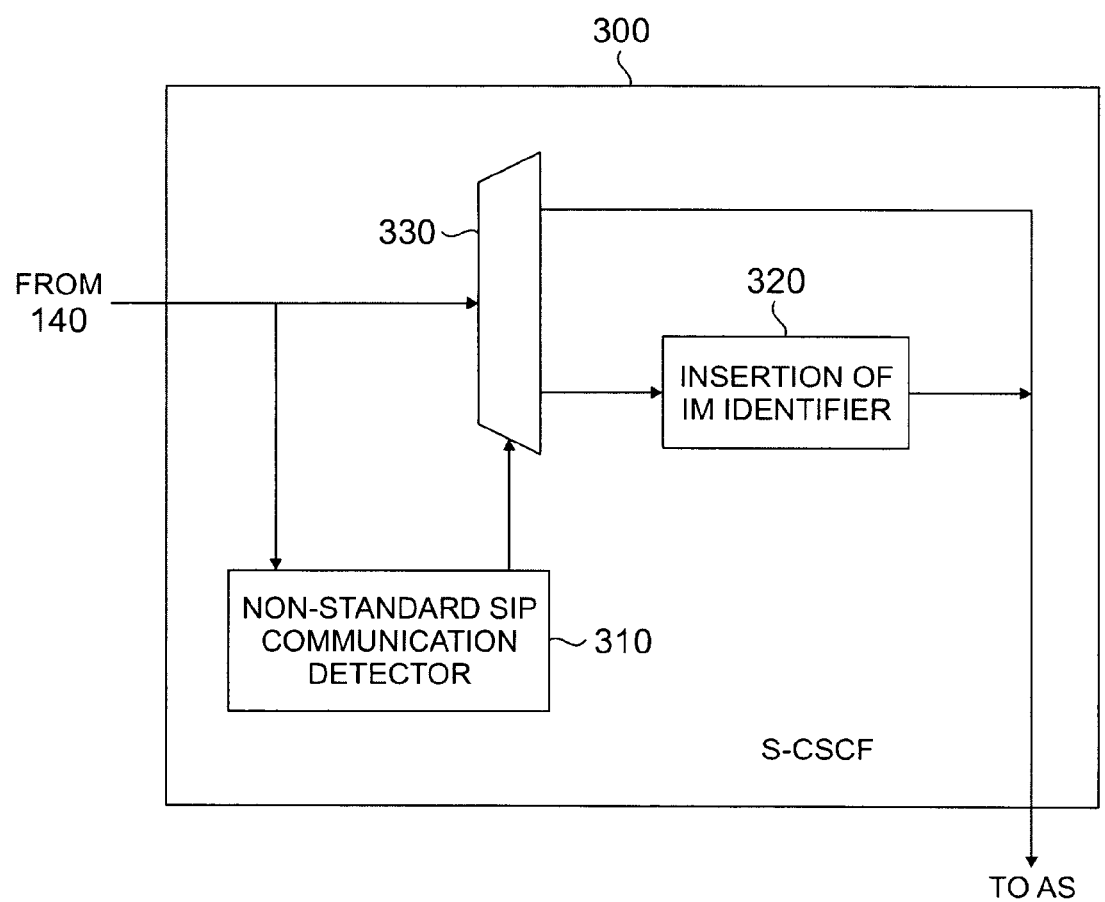
FIG. 3 illustrates a portion of the telecommunication network of FIG. 1 in more detail according to the principles of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged IP multimedia subsystem.

FIG. 1 illustrates telecommunication network 100, which comprises IP multimedia subsystem (IMS) 110 according to the principles of the present invention. Telecommunication network 100 comprises IP multimedia subsystem (IMS) 110, end-user device (EUD) 111, end-user device (EUD) 112, end-user device (EUD) 113, and end-user device (EUD) 114. End-user devices 111-114 communicate with IMS 110 via a public or a private Internet Protocol (IP) network, such as Internet 120. Alternatively, end-user devices 111-114 may communicate with IMS 110 via the public switched telephone network (PSTN). In the exemplary embodiment, end-user devices 111, 112 and 113 are Voice-over-IP devices, such as Internet phones, and end-user device 114 may be a processing system, such as a personal computer (PC) or server, or another network.

IP multimedia subsystem (IMS) 110 provides IP multimedia services including, for example, streaming audio, streaming video, text messaging, chat, and the like, to end-user devices 111-114 over Internet 120. IMS 110 comprises Internet protocol (IP) switch 130, front-end (or firewall) server group 140, and application server group 150. Front-end server group 140 comprises a plurality of front-end (or firewall) nodes, including front-end node (FN) 141 and front-end (FN) node 142. Application server group 150 comprises a plurality of call application nodes, including call application node (CAN) 151, call application node (CAN) 152, and call application node (CAN) 153.

Each of front-end nodes 141 and 142 comprises an application level gateway (ALG) application, such as ALG application 143 in FN 141. Each of call application nodes 151-153 contains control applications (or programs) for providing a plurality of call control functions or services, including, for example, policy decision function (PDF) applications, various types of application server (AS) applications, IMS-service switching function (IM-SSF) applications, proxy call session control function (P-CSCF) applications, serving call session control function (S-CSCF) applications, interrogator call session control function (I-CSCF) applications, and other control software.

The IMS standard specifies the use of the Session Initiation Protocol (SIP) messages between external network entities (e.g., end-user devices 111-114) and entities internal to IMS 100 (e.g., call applications nodes 151-153). The SIP message protocol is used, for example, between end-user devices 111-114 and the P-CSCF applications, the I-CSCF applications, the P-CSCF applications and the AS applications. SIP message traffic also occurs between the CSCF applications, which may be located anywhere in the network. The expected network traffic varies from system to system.

In IMS 110, the SIP stack is over UDP or TCP. End-user devices 111-114 send SIP messages that are targeted to a particular type of service. Each type of service is given an IP address provided by IP switch 130. As an example, there is a first IP address for the P-CSCF applications, a second IP address for the I-CSCF applications, a third IP address for the S-CSCF applications, and additional addresses for each type of AS application in IMS 110. IP switch 130 load-shares each received SIP message to group 140 of front-end nodes.

An ALG application in each front-end node receives the SIP message. The ALG application (e.g., ALG application (143) examines the SIP message to determine its route. The ALG application then routes the message to the appropriate target application, such as P-CSCF, I-CSCF, S-CSCF, and AS.

FIG. 2 is a flow diagram illustrating the operation of IP multimedia subsystem (IMS) 110 according to an exemplary embodiment of the present invention. FIG. 2 illustrates operations according to the invention wherein a first VoIP user, currently engaged in a VoIP call with a second VoIP user, can transfer the call to a third VoIP user in order to establish a VoIP call between the second VoIP user and the third VoIP user. More specifically, and referring also to FIG. 1, if a first VoIP user associated with EUD 111 is currently engaged in a VoIP call with second VoIP user associated with EUD 112, and wishes to transfer the call to a third VoIP user associated with EUD 113, the exemplary operations of FIG. 2 can be utilized to effectuate the call transfer.

The present invention utilizes the existing Instant Messaging (IM) capability of the IP multimedia subsystem 110 of FIG. 1. While EUD 111 is already engaged in a VoIP call with EUD 112, EUD 111 can send a call transfer request, in the form of a text-based Instant Message, to EUD 113. If EUD 113 accepts the call transfer request from EUD 111, then EUD 112 will be transferred to EUD 113 and a new RTP (Real Time Protocol) session will be established between EUD 111 and EUD 113. In order to invoke the Instant Message feature of the IP multimedia subsystem 110, the S-CSCF application needs to understand the intention of the initial request from EUD 111.

According to an exemplary embodiment, the S-CSCF application triggers the Instant Message service when the S-CSCF application receives from EUD 111 the SIP extension method, MESSAGE. According to SIP, the extension, MESSAGE, is permitted as an attachment to another SIP communication component such as REFER or SUBSCRIBE. Thus, when the MESSAGE component is received, but is not presented as an attachment to an appropriate SIP component, then the S-CSCF application can recognize that the MESSAGE is being used in a manner that is not a permitted communication according to SIP, and is in fact being utilized to trigger the IM capability of the IP multimedia subsystem 110.

As shown at 205 in FIG. 2, EUD 111 sends the SIP extension, MESSAGE, to EUD 113. The MESSAGE includes a request asking if EUD 113 wishes to receive the call from EUD 112, and the HREF field in the body of the MESSAGE includes a URL associated with EUD 112.

At 210, the S-CSCF application recognizes that the extension, MESSAGE, represents an IM request, and therefore knows that the IM capability of the IP multimedia subsystem 110 is to be triggered. After validating subscriber information appropriately, the S-CSCF application adds an IM identifier (e.g., im@samsung.net) to the Route Header of the MESSAGE, and forwards this modified MESSAGE to the AS application.

At 215, the AS application adds its AS address into the Record-Route Header, and invokes its IM service logic in response to the IM identifier that was added by the S-CSCF application. Then, generally according to its normal operation, the IM service logic within the AS application removes from the HREF field the URL associated with EUD 112, stores that URL, and replaces that URL in the HREF field with a private URL. The IM service logic associates this private URL with the stored URL of EUD 112. Having added its address to the Record-Route Header, the AS application ensures that all communications in the call transfer dialogue will traverse the AS application, and that the IM service logic of the AS application will support the entire call transfer dialogue. After these modifications have been performed with respect to the MESSAGE, the AS application relays the modified MESSAGE to EUD 113.

At 220, EUD 113 accepts the call transfer from EUD 112 by sending a SIP 200 OK communication in response to the received MESSAGE. The 200 OK ultimately propagates back to EUD 111 because EUD 111 was the originator of the MESSAGE.

At 225, the EUD 113 uses a SIP INVITE communication to send its SDP (Session Description Protocol) information to the private URL that the IM service logic placed into the HREF field in the body of the MESSAGE (see also 215).

At 230, the IM service logic of the AS application detects the private URL in the INVITE communication from EUD 113, replaces the private URL with the associated stored URL of EUD 112, and then forwards the modified INVITE communication to EUD 112.

At 235, EUD 112 responds to the modified INVITE communication with a 200 OK communication including the SDP information of EUD 112. Thereafter, at 240, an RTP connection between EUD 112 and EUD 113 is established. The RTP connection between EUD 112 and EUD 111 can be dropped at 245, for example, by EUD 112 sending a SIP BYE communication to EUD 111, and EUD 111 responding with a 200 OK communication.

As described above, by utilizing a non-standard SIP communication, an exemplary embodiment of the present invention can ensure that the S-CSCF application is informed that the Instant Messaging capability of the IP multimedia subsystem 110 is to be triggered. FIG. 3 illustrates a portion 300 of the S-CSCF application which implements this operation according to an exemplary embodiment of the invention. When a communication arrives at the S-CSCF application from the front-end section 140, a non-standard SIP communication detector 310 detects whether a predetermined non-standard SIP communication has arrived, for example a MESSAGE that is not attached to an appropriate SIP communication component (e.g. REFER or SUBSCRIBE). If this predetermined non-standard SIP communication is detected by the detector 310, then the detector 310 controls a selector 330 such that the received communication is routed through an inserter 320 which inserts an IM identifier into the received communication. The communication is then forwarded on to the AS application. If the detector 310 does not detect the predetermined non-standard SIP communication, then the detector 310 can control the selector 330 to forward the received communication without inserting the IM identifier.

As described above, the Instant Messaging capability of an IP multimedia subsystem is utilized according to the principles of the invention to support call transfer service for VoIP users. A call transfer request from a first VoIP user to a second VoIP user is sent to the IP multimedia subsystem in a predetermined non-standard SIP communication. The IP multimedia subsystem invokes Instant Messaging service in response to the predetermined non-standard SIP communication, and Instant Messaging service is then utilized to support the call transfer dialogue.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a telecommunication network, an Internet Protocol (IP) multimedia subsystem, comprising:
an IP switch capable of receiving Session Initiation Protocol (SIP) communications from an external IP network;
a call application node capable of executing a plurality of service applications including a serving call session control function (S-CSCF) application and an application server (AS) application, wherein said IP switch routes SIP communications to said S-CSCF application;
said S-CSCF application capable of receiving, from a first Voice over IP (VoIP) user via the external IP network and said IP switch, a communication that includes a request from the first VoIP user to transfer to a second VoIP user a VoIP call that is currently in progress between the first VoIP user and a third VoIP user, said S-CSCF application capable of recognizing that the received communication includes a SIP communication component but fails to constitute a communication permitted by SIP, and, in response to said recognizing, said S-CSCF application capable of modifying the received communication to include an Instant Messaging (IM) identifier and forwarding the modified communication to said AS application; and
in response to said IM identifier in said modified communication, said AS application processing said modified communication as an Instant Message, wherein said AS application is capable of removing from said modified communication an identifier associated with the third VoIP user, said AS application capable of associating the removed identifier with a further identifier, said AS application capable of inserting said further identifier into said modified communication to replace said removed identifier and thereby produce a further-modified communication, and said AS application capable of forwarding the further-modified communication to the second VoIP user.

2. The IP multimedia subsystem as set forth in claim 1, wherein said SIP communication component includes an extension according to SIP.

3. The IP multimedia subsystem as set forth in claim 2, wherein said extension is a MESSAGE extension according to SIP.

4. The IP multimedia subsystem as set forth in claim 2, wherein said S-CSCF application includes a detector capable of detecting when an extension according to SIP is received other than in a communication permitted by SIP.

5. The IP multimedia subsystem as set forth in claim 1, wherein said AS application is capable of receiving from the second VOIP user, via the external IP network and said IP switch, a SIP INVITE communication including said further identifier and SDP information associated with the second VoIP user, said AS application capable of replacing said further identifier with said removed identifier to produce a modified INVITE communication, and said AS application capable of forwarding said modified INVITE communication to the third VoIP user.

6. The IP multimedia subsystem as set forth in claim 1, wherein said S-CSCF application includes a detector capable of detecting when a predetermined SIP communication component is received other than in a communication permitted by SIP.

7. The IP multimedia subsystem as set forth in claim 1, wherein said further identifier is a private uniform resource locator.

8. A telecommunication network comprising:
a plurality of Voice over IP (VoIP) user devices capable of communicating according to the Session Initiation Protocol (SIP);
an Internet Protocol (IP) network coupled to said plurality of VoIP user devices; and
an IP multimedia subsystem coupled to said IP network, said IP multimedia subsystem comprising:
an IP switch capable of receiving Session Initiation Protocol (SIP) communications from an external IP network;
a call application node capable of executing a plurality of service applications including a serving call session control function (S-CSCF) application and an application server (AS) application, wherein said IP switch routes SIP communications to said S-CSCF application;
said S-CSCF application capable of receiving from a first said VoIP user device a communication that includes a request from the first VoIP user device to transfer to a second said VoIP user device a VoIP call that is currently in progress between the first VoIP user device and a third said VoIP user device, said S-CSCF application capable of recognizing that the received communication includes a SIP communication component but fails to constitute a communication permitted by SIP, and, in response to said recognizing, said S-CSCF application capable of modifying the received communication to include an Instant Messaging (IM) identifier and forwarding the modified communication to said AS application; and in response to said IM identifier in said modified communication, said AS application processing said modified communication as an Instant Message, wherein said AS application is capable of removing from said modified communication an identifier associated with the third VoIP user device, said AS application capable of associating the removed identifier with a further identifier, said AS application capable of inserting said further identifier into said modified communication to replace said removed identifier and thereby produce a further-modified communication, and said AS application capable of forwarding the further-modified communication to the second VoIP user device.

9. The telecommunication network as set forth in claim 8, wherein said SIP communication component includes an extension according to SIP.

10. The telecommunication network as set forth in claim 9, wherein said extension is a MESSAGE extension according to SIP.

11. The telecommunication network as set forth in claim 9, wherein said S-CSCF application includes a detector capable of detecting when an extension according to SIP is received other than in a communication permitted by SIP.

12. The telecommunication network as set forth in claim 8, wherein said AS application is capable of receiving from the second VOIP user device a SIP INVITE communication including said further identifier and SDP information associated with the second VoIP user device, said AS application capable of replacing said further identifier with said removed identifier to produce a modified INVITE communication, and said AS application capable of forwarding said modified INVITE communication to the third VoIP user device.

13. The telecommunication network as set forth in claim 8, wherein said S-CSCF application includes a detector capable of detecting when a predetermined SIP communication component is received other than in a communication permitted by SIP.

14. The telecommunication network as set forth in claim 8, wherein said further identifier is a private uniform resource locator.

15. For use in an Internet Protocol (IP) multimedia subsystem comprising an IP switch and a call application node for executing a plurality of service applications including a serving call session control function (S-CSCF) application and an application server (AS) application, a method of processing a transfer of a Voice over IP (VoIP) call comprising the steps of:

the S-CSCF application receiving from a first VoIP user a communication that includes a request to transfer to a second VoIP user a VoIP call that is currently in progress between the first VoIP and a third VoIP user;

the S-CSCF application recognizing that the received communication includes a SIP communication component but fails to constitute a communication permitted by SIP;

in response to said recognizing, the S-CSCF application modifying the received communication to include an Instant Message (IM) identifier and forwarding the modified communication to the AS application;

in response to the IM identifier in the modified communication, the AS application processing the modified communication as an Instant Message; and the AS application removing from said modified message an identifier associated with the third VoIP user, the AS application associating the removed identifier with a further identifier, the AS application inserting into the modified communication a further identifier to replace said removed identifier and thereby produce a further-modified communication, and the AS application forwarding the further-modified communication to the second VoIP user.

16. The method as set forth in claim 15, wherein the SIP communication component includes an extension according to SIP.

17. The method as set forth in claim 16, wherein said extension is a MESSAGE extension.

18. The method as set forth in claim 15, including the S-CSCF detecting when a predetermined SIP communication component is received other than in a communication permitted by SIP.

19. The method as set forth in claim 15, including the AS application receiving from the second VoIP user a SIP INVITE communication including said further identifier and SDP information associated with the second VoIP user, the AS application replacing said further identifier in the INVITE communication with said removed identifier to produce a modified INVITE communication, and the AS application forwarding the modified INVITE communication to the third VoIP user.

20. The method as set forth in claim 15, wherein said further identifier is a private uniform resource locator.

* * * * *

UNITED STATES PATENT AND TRADEMARK OFFICE
CERTIFICATE OF CORRECTION

PATENT NO. : 7,586,903 B2  Page 1 of 1
APPLICATION NO. : 11/148758
DATED : September 8, 2009
INVENTOR(S) : Song et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1126 days.

Signed and Sealed this

Twenty-first Day of September, 2010

David J. Kappos
*Director of the United States Patent and Trademark Office*